US012586371B2

(12) United States Patent
James et al.

(10) Patent No.: US 12,586,371 B2
(45) Date of Patent: Mar. 24, 2026

(54) SENSOR DATA PROCESSING

(71) Applicant: TidalX AI Inc, San Ramon, CA (US)

(72) Inventors: Barnaby John James, Campbell, CA (US); Grace Taixi Brentano, Redwood City, CA (US)

(73) Assignee: TidalX AI Inc., Mountain View, CA (US)

( * ) Notice: Subject to any disclaimer, the term of this patent is extended or adjusted under 35 U.S.C. 154(b) by 1183 days.

(21) Appl. No.: 17/342,719

(22) Filed: Jun. 9, 2021

(65) Prior Publication Data

US 2022/0394957 A1 Dec. 15, 2022

(51) Int. Cl.
*G06V 20/00* (2022.01)
*G06N 20/00* (2019.01)

(52) U.S. Cl.
CPC ............. *G06V 20/00* (2022.01); *G06N 20/00* (2019.01); *A01K 2227/40* (2013.01); *A01K 2227/70* (2013.01)

(58) Field of Classification Search
CPC . A01K 2227/40; A01K 2227/70; G06V 20/00
See application file for complete search history.

(56) References Cited

U.S. PATENT DOCUMENTS

| | | | | |
|---|---|---|---|---|
| 10,333,953 | B1 * | 6/2019 | Averbuch | G06F 21/554 |
| 10,410,113 | B2 * | 9/2019 | Clayton | G06N 3/045 |
| 10,762,894 | B2 * | 9/2020 | Sainath | G06N 3/045 |
| 10,856,520 | B1 * | 12/2020 | Kozachenok | A01K 61/80 |
| 11,464,213 | B2 * | 10/2022 | Rishi | A01K 61/10 |
| 11,674,806 | B2 * | 6/2023 | Tulgara | G01S 7/6281 |
| | | | | 701/431 |
| 11,925,173 | B2 * | 3/2024 | Rishi | A01K 61/60 |

(Continued)

FOREIGN PATENT DOCUMENTS

| | | | |
|---|---|---|---|
| CL | 2019000039 A1 | | 3/2019 |
| CN | 103782914 B | * | 2/2016 |

(Continued)

OTHER PUBLICATIONS

Mike Yi, "A complete guide to heatmaps", published Nov. 13, 2019 to https://www.atlassian.com/data/charts/heatmap-complete-guide, retrieved Nov. 13, 2024. (Year: 2019).*

(Continued)

*Primary Examiner* — Shourjo Dasgupta
(74) *Attorney, Agent, or Firm* — Fish & Richardson P.C.

(57) ABSTRACT

Methods, systems, and apparatus, including computer programs encoded on computer-storage media, for sensor data processing. The method may include the actions of obtaining sensor data regarding aquatic livestock over periods of time, where the sensor data is captured by at least one sensor at different depths, determining, for each of the periods of time, whether the sensor data captured at different depths during the period of time satisfy one or more evaluation criteria, generating an input data set that concatenates representations of the periods of time, providing the input data set to a machine-learning trained model, receiving, as an output from the machine-learning trained model, an indication of an action to be performed for the aquatic livestock, and initiating performance of the action for the aquatic livestock.

20 Claims, 3 Drawing Sheets

(56) References Cited

U.S. PATENT DOCUMENTS

| | | | | | |
|---|---|---|---|---|---|
| 2013/0206078 | A1* | 8/2013 | Melberg | ............... | A01K 61/80 |
| | | | | | 119/230 |
| 2017/0150701 | A1 | 6/2017 | Gilmore et al. | | |
| 2019/0228218 | A1 | 7/2019 | Barnaby et al. | | |
| 2019/0340440 | A1* | 11/2019 | Atwater | ................... | G06T 7/20 |
| 2020/0107524 | A1 | 4/2020 | Messana et al. | | |
| 2020/0113158 | A1 | 4/2020 | Rishi et al. | | |
| 2020/0155882 | A1 | 5/2020 | Tohidi et al. | | |
| 2020/0170227 | A1* | 6/2020 | Rishi | ..................... | G06V 40/20 |
| 2020/0288678 | A1 | 9/2020 | Howe et al. | | |
| 2021/0089947 | A1* | 3/2021 | Beavers, Jr. | ............. | G06N 5/04 |
| 2021/0169025 | A1* | 6/2021 | Burgard | ................ | G06T 7/0012 |
| 2021/0212284 | A1* | 7/2021 | Kozachenok | .... | G06Q 10/06315 |
| 2021/0212285 | A1* | 7/2021 | Kozachenok | .......... | G06Q 50/02 |
| 2022/0000079 | A1* | 1/2022 | Chen | ...................... | G01S 15/10 |
| 2022/0067510 | A1* | 3/2022 | Jayakumar | ......... | G06Q 30/0185 |
| 2022/0343439 | A1* | 10/2022 | Jensen | .................... | G01W 1/02 |
| 2023/0260327 | A1* | 8/2023 | Canning | ................... | G06T 7/20 |
| | | | | | 382/100 |

FOREIGN PATENT DOCUMENTS

| | | | | | |
|---|---|---|---|---|---|
| CN | 108040948 | | 5/2018 | | |
| EP | 2244934 | | 11/2010 | | |
| EP | 3484283 | | 5/2019 | | |
| JP | 2002171853 | | 6/2002 | | |
| NO | 300401 | | 5/1997 | | |
| NO | 20160199 | | 8/2017 | | |
| WO | WO 1990/007874 | | 7/1990 | | |
| WO | WO 1997/019587 | | 6/1997 | | |
| WO | WO 2009/008733 | | 1/2009 | | |
| WO | WO 2009/097057 | | 8/2009 | | |
| WO | WO2012081990 | | 6/2012 | | |
| WO | WO 2014/179482 | | 11/2014 | | |
| WO | WO2017137896 | | 8/2017 | | |
| WO | WO 2018/011744 | | 1/2018 | | |
| WO | WO2018011745 | | 1/2018 | | |
| WO | WO 2019/002881 | | 1/2019 | | |
| WO | WO 2019/121851 | | 6/2019 | | |
| WO | WO 2019/188506 | | 10/2019 | | |
| WO | WO 2019/232247 | | 12/2019 | | |
| WO | WO 2020/046524 | | 3/2020 | | |
| WO | WO-2020046523 | A1 * | 3/2020 | ............ | A01K 61/60 |
| WO | WO 2020/132031 | | 6/2020 | | |
| WO | WO 2021/006744 | | 1/2021 | | |
| WO | WO 2021/030237 | | 2/2021 | | |
| WO | WO 2022/010815 | | 1/2022 | | |
| WO | WO 2020/072438 | | 4/2022 | | |

OTHER PUBLICATIONS

Suresh Neethirajan, "The role of sensors, big data and machine learning in modern animal farming", published via Sensing and Bio-Sensing Research, No. 29, 2020, retrieved Nov. 13, 2024. (Year: 2020).*

Emanuele Fumagalli, "Simple Time Series EDA using Pandas and Seaborn", published on Feb. 26, 2020 to https://medium.com/@emafuma/simple-time-series-eda-using-pandas-and-seaborn-b3e2ef9636e6, retrieved Nov. 13, 2024. (Year: 2020).*

Alberto L. Barriuso, etc., "Combination of Multi-Agent Systems and Wireless Sensor Networks for the Monitoring of Cattle", published Jan. 2, 2018 to Sensors, retrieved Nov. 13, 2024. (Year: 2018).*

Seyed Yaser Samadi, "Matrix Time Series Analysis", made available as a submitted thesis in May 2014, retrieved from https://getd.libs.uga.edu/pdfs/samadi_seyed-yaser_201405_phd.pdf on Apr. 29, 2025. (Year: 2014).*

Matlab, "Append", published on Feb. 10, 2012 to https://www.mathworks.com/help/matlab/ref/timeseries.append.html, retrieved Apr. 29, 2025. (Year: 2012).*

Ken Fordyce, "Tools of the Trade: How to Compare/ Combine Diverse Time Series—"Normalizing"", published on May 12, 2021 to https://blog.arkieva.com/compare-combine-diverse-time-series-normalizing, retrieved Apr. 29, 2025. (Year: 2021).*

Scott Owen, etc., "Chapter 4: Vectors, Matrices, and Linear Algebra", published on Jan. 18, 2009 to https://web.stanford.edu/class/nbio228-01/handouts/Ch4_Linear_Algebra.pdf, retrieved Apr. 29, 2025. (Year: 2009).*

"Appendix A—Vectors and Matrices", published on Aug. 14, 2020 to https://web.mit.edu/15.053/www/AMP-Appendix-A.pdf, retrieved Apr. 29, 2025. (Year: 2020).*

Lidia Muñoz, etc. "Acoustic Telemetry: A Tool to Monitor Fish Swimming Behavior", published Jul. 31, 2020 to Frontiers in Marine Science, vol. 7, p. 645, retrieved Nov. 14, 2025. (Year: 2020).*

Maloy et al., "A spatio-temporal recurrent network for salmon feeding action recognition from underwater videos in aquaculture," Computers and Electronics in Agriculture, Nov. 12, 2019, 9 pages.

Odey, "AquaMesh—Design and Implementation of Smart Wireless Mesh Sensor Networks for Aquaculture," American Journal of Networks and Communications, Jul. 2013, 8 pages.

Petrov et al., "Overview of the application of computer vision technology in fish farming," E3S Web of Conferences, 2020, 175:02015.

Saberloon et al., "Application of Machine Vision Systems in Aquaculture with Emphasis on Fish: State-of-the-Art and Key Issues," Reviews in Aquaculture, Dec. 2017, 9:369-387.

towardsdatascience.com [online], "Analyzing Applications of Deep Learning in Aquaculture," Jan. 2021, retrieved on Aug. 11, 2021, retrieved from URL<https://towardsdatascience.com/analyzing-applications-of-deep-learning-in-aquaculture-7a273399553/>, 12 pages.

Wang, "Robust tracking of fish schools using CNN for head identification," Multimedia Tools and Applications, Nov. 2017, 20 pages.

Extended Search Report in European Appln. No. 22151132.2, dated May 2, 2022, 10 pages.

International Preliminary Report on Patentability in International Appln. No. PCT/US2020/059829, dated May 27, 2022, 11 pages.

International Search Report and Written Opinion in International Appln No. PCT/US2022/018651, dated Jun. 22, 2022, 14 pages.

International Search Report and Written Opinion in International Appln No. PCT/US2022/021683, dated Jun. 27, 2022, 14 pages.

International Search Report and Written Opinion in International Appln No. PCT/US2022/022250, dated Jul. 6, 2022, 15 pages.

International Search Report and Written Opinion in International Appln No. PCT/US2022/022492, dated Jun. 28, 2022, 13 pages.

International Search Report and Written Opinion in International Appln No. PCT/US2022/022589, dated Jul. 7, 2022, 12 pages.

International Search Report and Written Opinion in International Appln No. PCT/US2022/022837, dated Aug. 2, 2022, 14 pages.

International Search Report and Written Opinion in International Appln No. PCT/US2022/023831, dated Jul. 8, 2022, 13 pages.

International Search Report and Written Opinion in International Appln. No. PCT/US2020/059829, dated Feb. 25, 2021, 18 pages.

Meidell et al., "FishNet: A Unified Embedding for Salmon Recognition," Thesis for Master's degree in Artificial Intelligence, Norwegian University of Science and Technology, Jun. 2019, 86 pages.

Moskvyak et al., "Robust Re-identification of Manta Rays from Natural Markings by Learning Pose Invariant Embeddings," CoRR, Feb. 2019, arXiv:1902.10847v1, 12 pages.

Qiu et al., ""Improving Transfer Learning and Squeeze- and-Excitation Networks for Small-Scale Fine-Grained Fish Image Classification," IEEE Access, Dec. 2018, 6(31):78503-78512".

Stein et al., "Consistent melanophore spot patterns allow long-term individual recognition of Atlantic salmon Salmo salar," Journal of Fish Biology, Nov. 2017, 91(6):1699-1712.

International Preliminary Report on Patentability in International Appln. No. PCT/US2022/022844, dated Dec. 21, 2023, 9 pages.

International Search Report and Written Opinion in International Appln. No. PCT/US2022/022844, dated Nov. 7, 2022, 13 pages.

* cited by examiner

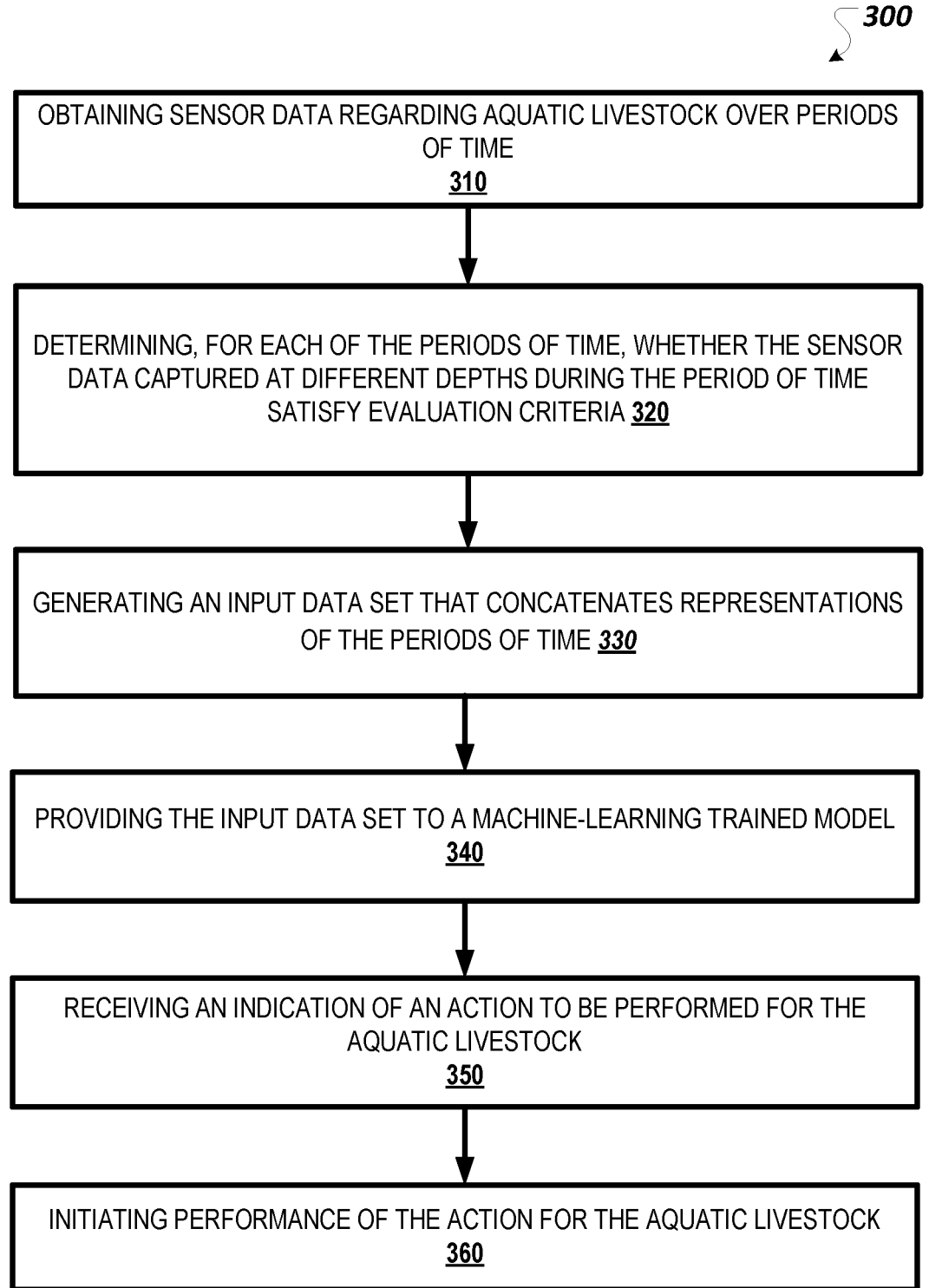

300

OBTAINING SENSOR DATA REGARDING AQUATIC LIVESTOCK OVER PERIODS OF TIME
310

DETERMINING, FOR EACH OF THE PERIODS OF TIME, WHETHER THE SENSOR DATA CAPTURED AT DIFFERENT DEPTHS DURING THE PERIOD OF TIME SATISFY EVALUATION CRITERIA 320

GENERATING AN INPUT DATA SET THAT CONCATENATES REPRESENTATIONS OF THE PERIODS OF TIME 330

PROVIDING THE INPUT DATA SET TO A MACHINE-LEARNING TRAINED MODEL
340

RECEIVING AN INDICATION OF AN ACTION TO BE PERFORMED FOR THE AQUATIC LIVESTOCK
350

INITIATING PERFORMANCE OF THE ACTION FOR THE AQUATIC LIVESTOCK
360

FIG. 3

SENSOR DATA PROCESSING

FIELD

This specification relates to the collection and processing of sensor data, and one particular implementation relates to automatically performing actions in an aquaculture environment based on processing data from underwater cameras.

BACKGROUND

Aquaculture involves the farming of aquatic livestock, such as fish, crustaceans, or aquatic plants. In aquaculture, and in contrast to commercial fishing, freshwater and saltwater livestock populations are cultivated in controlled environments. For example, the farming of fish can involve raising fish in tanks, fish ponds, or ocean enclosures.

Humans farming aquatic livestock may make decisions based on observations of the aquatic livestock. For example, a human may see that a particular fish has sea lice and, in response, treat the particular fish for sea lice. However, humans are limited in their ability to make observations. For example, human observers may have limited time to make observations, and may have limited attention when making observations.

SUMMARY

In general, innovative aspects of the subject matter described in this specification relate to sensor data processing. Sensor data may be used to automatically initiate actions for aquatic livestock. For example, the sensor data may indicate that fish have slowly stopped consuming feed and, based on the sensor data, an aquaculture system may automatically stop providing feed to the fish.

The sensor data may be collected by a sensor subsystem that performs a patrol of an aquatic livestock enclosure and that, during the patrol, makes observations of fish at different depths and different periods of time. For example, the sensor subsystem may be continually moved between ten meters deep to sixty meters deep across different periods of time. Each of the periods of time may correspond to a length of time for the sensor subsystem to move from a top most depth to a bottom most depth, or vice versa. For example the time to descend from ten to sixty meters deep may be a first time period, and the time to ascend from sixty meters to ten meters deep may be a second time period.

Sensor data collected at different depths and different periods of time may be processed to generate a data set, where the data set is structured in a manner that allows the data set to be used as input into a machine-learning trained model. For example, the data set may include a first, second, and third column, where the first column represents sensor data captured while the sensor subsystem descends from ten meters deep to sixty meters deep, the second column represents sensor data captured while the sensor subsystem next ascends from sixty meters deep to ten meters deep, and the third column represents sensor data captured while the sensor subsystem again descends from ten meters deep to sixty meters deep. In the example, the three columns together may show that fish were mostly at the top of the enclosure during the first period, indicating most of the fish were feeding, then half of the fish were at the top of the enclosure during the second period, indicating that half of the fish may be no longer feeding, and then the fish were evenly distributed throughout the enclosure during the third period, which may indicate that the fish are no longer hungry and not consuming feed.

Processing the sensor data to generate the data set may include determining, for each period of time and for each depth, whether evaluation criteria was satisfied for that depth for that period. For example, the evaluation criteria may be that at least five fish were observed, the system may determine that at least five fish were not observed between twenty five to forty meters deep during a second period and, in response, the system may generate the data set to indicate in a second column and a second row that at least five fish were not observed, where the second column corresponds to the second period and the second row corresponds to the depth of twenty five to forty meters.

The machine-learning trained model may receive the data set, also referred to as an input data set, and output an indication of an action to be performed based on the input data set. For example, the machine-learning trained model may be trained with a training data set that indicates that a data set that shows fish gradually moving away from a top of the enclosure corresponds to an action of reducing feeding rate and, in response, to receiving an input data set indicating that pattern, output an indication to reduce feeding. Such a data set may be particularly useful for a machine-learning model as the data set may represent a snapshot of what is occurring in context at different depth in the enclosure, with the additional context of how things have changed over time at the different depths.

A system that processes sensor data may increase efficiency in farming aquatic livestock. For example, the automated control may allow a system to automatically increase a rate that feed is provided to fish while the fish are eating most of the feed, and automatically decrease or stop providing feed to fish when the fish are not eating most of the feed. Accordingly, the system may decrease feed wasted in raising livestock by reducing an amount of unconsumed feed, and increase yield by providing more feed while the fish are consuming the feed.

One innovative aspect of the subject matter described in this specification is embodied in a method that includes obtaining sensor data regarding aquatic livestock over periods of time, where the sensor data is captured by at least one sensor at different depths inside an aquatic livestock enclosure, determining, for each of the periods of time, whether the sensor data captured at different depths during the period of time satisfy one or more evaluation criteria, generating an input data set that concatenates representations of the periods of time, where each of the representations of the periods of time indicates whether the sensor data captured at the different depths during the period of time satisfy the evaluation criteria, providing the input data set to a machine-learning trained model, receiving, as an output from the machine-learning trained model, an indication of an action to be performed for the aquatic livestock, and initiating performance of the action for the aquatic livestock.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some aspects determining, for each of the periods of time, whether the sensor data captured at different depths during the period of time satisfy one or more evaluation criteria includes determining whether the sensor data captured at a first depth during a particular period of time satisfies the evaluation criteria and determining whether the sensor data captured at a second depth, that is below the first depth, during the particular period of time satisfies the evaluation criteria. In certain aspects, obtaining sensor data regarding aquatic livestock over periods of time, where the sensor data is captured by at least one sensor at different depths inside an aquatic livestock enclosure includes obtaining images of the aquatic livestock captured by a camera at the different depths inside the aquatic livestock enclosure.

In some implementations, obtaining sensor data regarding aquatic livestock over periods of time, where the sensor data is captured by at least one sensor at different depths inside an aquatic livestock enclosure includes obtaining a first portion of the sensor data regarding the aquatic livestock for a first period of time and after obtaining the first portion of the sensor data regarding the aquatic livestock for the first period of time, obtaining a second portion of the sensor data regarding the aquatic livestock for a second period of time that is after the first period of time. In some aspects, the input data set includes a heat map that represents time along a first dimension and depth along a second dimension, and values at positions in the heat map represent a number of times the evaluation criteria was satisfied at the different depths for each of the periods of time.

In certain aspects, columns in the heat map each correspond to a period of time in the periods of time. In some implementations, receiving, as an output from the machine-learning trained model, an indication of an action to be performed for the aquatic livestock includes receiving an indication to reduce an amount of feed provided to the aquatic livestock. In some aspects, receiving, as an output from the machine-learning trained model, an indication of an action to be performed for the aquatic livestock includes receiving an indication to increase an amount of feed provided to the aquatic livestock. In certain aspects, actions include obtaining training data that includes input data sets that each concatenate representations of previous periods of time and, for each of the input data sets in the training data, a respective indication of a respective action to be performed for the aquatic livestock and training the machine-learning trained model with the training data. In certain aspects, the aquatic livestock comprise one or more of fish or crustaceans.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIG. 3 is flow diagram for an example process for processing of sensor data.

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1:
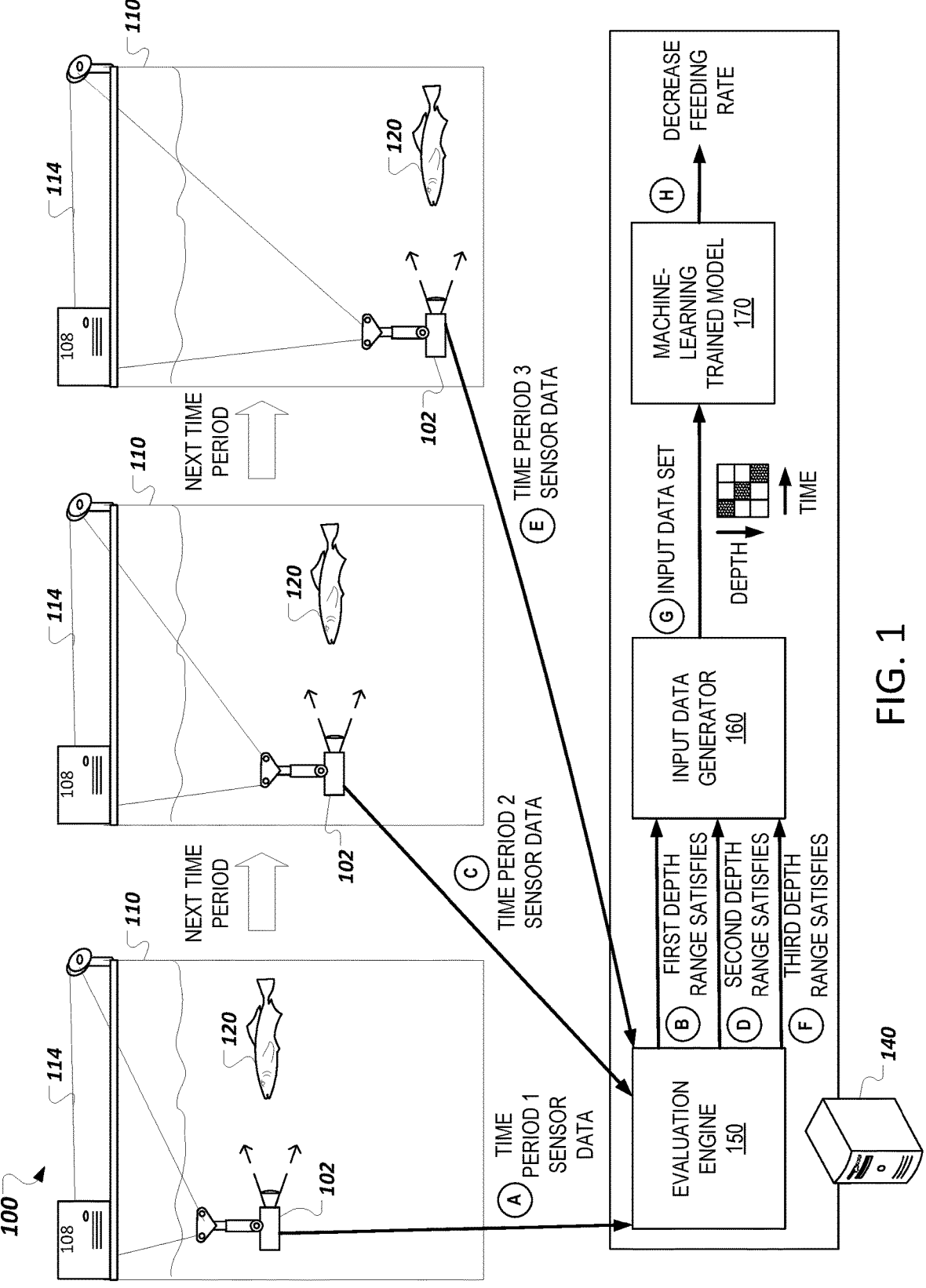
FIG. 1 is a diagram of an example system for sensor data processing.

FIG. 1 is a diagram of an example system 100 for sensor data processing. The system 100 includes a sensor subsystem 102 that collects sensor data from different depths in an enclosure 110, a winch subsystem 108 that moves the sensor subsystem 102, and a control subsystem 140 that generates data sets from the collected sensor data and initiates actions based on the data sets.

The enclosure 110 may enclose livestock that can be aquatic creatures, such as livestock 120, which swim freely within the confines of the enclosure 110. In some implementations, the aquatic livestock 120 stored within the enclosure 110 can include finfish or other aquatic lifeforms. The livestock 120 can include for example, juvenile fish, koi fish, sharks, salmon, bass, or crustaceans, e.g., shrimp, to name a few examples.

In addition to the aquatic livestock, the enclosure 110 contains water, e.g., seawater, freshwater, or rainwater, although the enclosure can contain any appropriate liquid that is capable of sustaining a habitable environment for the aquatic livestock.

In some implementations, the system 100 may be anchored to a structure such as a pier, dock, or buoy. For example, instead of being confined within the enclosure 110, the livestock 120 can be free to roam a body of water, and the system 100 can monitor livestock within a certain area of the body of water without the enclosure 110.

The system 100 can be used to collect various sensor data from different depths in the enclosure 110 and at different times. For example, the system 100 may collect sensor data that indicates where, how much, and for how long fish are feeding within the enclosure 110.

The system 100 may initiate actions based on the collected sensor data. For example, the system 100 may determine that the fish are no longer eating the feed and, in response, instruct a feeder to stop providing feed. In another example, the system 100 may determine that the fish are eating the feed but also a large portion of the feed is uneaten by the fish and, in response, instruct a blower or auger to reduce a rate that feed is being provided to the fish. In yet another example, the system 100 may determine that the fish are quickly eating all the feed and, in response, instruct an auger or blower to increase a rate that feed is being provided to the fish.

The winch subsystem 108 may move the sensor subsystem 102 in a patrol pattern up and down to different depths in the enclosure 110. The winch subsystem 108 can include one or more motors, one or more power supplies, and one or more pulleys to which the cord 114, which suspends the sensor subsystem 102, is attached. A pulley is a machine used to support movement and direction of a cord, such as cord 114. Although the winch subsystem 108 includes a single cord 114, any configuration of one or more cords and one or more pulleys that allows the sensor subsystem 102 to move and rotate, as described herein, can be used.

The winch subsystem 108 may activate one or more motors to move the cord 114. The cord 114, and the attached sensor subsystem 102, can be moved along the x, y, and z-directions, to a position corresponding to the instruction. A motor of the winch subsystem 108 can be used to rotate the sensor subsystem 102 to adjust the horizontal angle and the vertical angle of the sensor subsystem. A power supply can power the individual components of the winch subsystem. The power supply can provide AC and DC power to each of the components at varying voltage and current levels. In some implementations, the winch subsystem can include multiple winches or multiple motors to allow motion in the x, y, and z-directions.

The sensor subsystem 102 can include one or more sensors that can monitor the livestock. The sensor subsystem 102 may be waterproof and can withstand the effects of external forces, such as typical ocean currents, without breaking. The sensor subsystem 102 can include one or more sensors that acquire sensor data, e.g., images and video footage, thermal imaging, heat signatures, according to the types of sensor of the sensor subsystem. For example, the sensor subsystem 102 can include one or more of the following sensors: a camera, an IR sensor, a UV sensor, a heat sensor, a pressure sensor, a hydrophone, a water current sensor, or a water quality sensor such as one that detects oxygen saturation or an amount of a dissolved solid.

The system 100 can additionally store the sensor data captured by the sensor subsystem 102 in a sensor data storage. In some implementations, the system 100 can store media, such as video and images, as well as sensor data, such as ultrasound data, thermal data, and pressure data, to name a few examples. Additionally, the sensor data can include GPS information corresponding to a geolocation at which the sensor subsystem captured the sensor data.

One or both of the sensor subsystem 102 and the winch subsystem 108 can include inertial measurement devices for tracking motion and determining position of the sensor subsystem, such as accelerometers, gyroscopes, and magnetometers. The winch subsystem 108 can also keep track of the amount of cord 114 that has been spooled out and reeled in, to provide another input for estimating the position of the sensor subsystem 102. In some implementations the winch subsystem 108 can also provide torques applied to the cord, to provide input on the position and status of the sensor subsystem 102. In some implementations, the sensor subsystem 102 can be attached to an autonomous underwater vehicle (AUV), e.g., a tethered or untethered AUV.

In the example of FIG. 1, the sensor subsystem 102 includes a camera which is fully submerged in the enclosure 110, although in other embodiments, the sensor subsystem can acquire sensor data without completely submerging the sensor subsystem, e.g., while the sensor subsystem is suspended above the water.

The control subsystem 140 generates data sets from the collected sensor data and initiates actions based on the data sets. The control subsystem 140 may be one or more computers. The control subsystem 140 may include an evaluation engine 150 that evaluates sensor data, an input data generator 160 that generates an input data set based on evaluations of the sensor data, and a machine-learning trained model 170 that indicates an action to initiate based on the input data set.

The evaluation engine 150 may receive sensor data that is collected at different depths during different time periods. For example, during a first five minute period of time, the evaluation engine 150 may obtain video captured by the sensor subsystem 102 while the sensor subsystem 102 descends from ten meters deep to sixty meters deep. During a second five minute period of time immediately after the first period of time, the evaluation engine 150 may obtain video captured by the sensor subsystem 102 while the sensor subsystem 102 ascends from sixty meters deep to ten meters deep. And during a third five minute period of time immediately after the second period of time, the evaluation engine 150 may obtain video captured by the sensor subsystem 102 while the sensor subsystem 102 descends from ten meters deep to sixty meters deep.

The evaluation engine 150 may evaluate the sensor data to determine whether the sensor data satisfies evaluation criteria 320. For example, the evaluation criteria may be detection of a fish at a depth range. In the example, the evaluation engine 150 may determine for a first five minute period of time that a fish was detected at a depth range of ten to twenty five meters, that no fish were detected at a depth range of twenty five to forty meters, and that no fish were detected at a depth range of forty to sixty meters, determine for a second five minute period of time that no fish were detected at a depth range of ten to twenty five meters, that a fish was detected at a depth range of twenty five to forty meters, and that no fish were detected at a depth range of forty to sixty meters, and determine for a third five minute period of time that no fish were detected at a depth range of ten to twenty five meters, that no fish were detected at a depth range of twenty five to forty meters, and that a fish was detected at a depth range of forty to sixty meters.

The evaluation criteria may be other criteria than detection of fish. For example, evaluation criteria may be one or more of mouth gape, swim speed, pitch angle, sharp direction changes, or curved body. Mouth gape may indicate that fish are opening their mouths more to feed. Swim speed may indicate that fish are swimming at a faster speed to intercept feed. Pitch angle may indicate that fish are swimming more upwards to intercept feed above the fish. Sharp direction changes may indicate that fish are sharply changing direction more to intercept feed. Curved body may indicate that fish are curving their bodies more to intercept feed. Other evaluation criteria may include that water quality, water temperature, or other factor satisfies a threshold or range.

The evaluation engine 150 may provide results of the evaluation to the input data generator 160. For example, at the end of the first period of time, the evaluation engine 150 may provide an indication that for the first period of time, only a first depth range, which corresponds to a depth range of ten to twenty five meters, satisfied the evaluation criteria. At the end of the second period of time, the evaluation engine 150 may provide an indication that for the second period of time, only a second depth range, which corresponds to a depth range of twenty five to forty meters, satisfied the evaluation criteria. And at the end of the third period of time, the evaluation engine 150 may provide an indication that for the third period of time, only a third depth range, which corresponds to a depth range of forty to sixty meters, satisfied the evaluation criteria.

The input data generator 160 may generate an input data set based on the results of the evaluation by the evaluation engine 150. For example, the input data generator 160 may generate a data structure that represents a three by three matrix, where the matrix includes three columns and three rows. The three columns may include a first column corresponding to the first period of time, a second column corresponding to the second period of time, and a third column corresponding to the third period of time. The three rows may include a first row corresponding to the first depth range, a second row corresponding to the second depth range, and a third row corresponding to the third depth range. The values of each of the intersections of columns and rows may be binary values, where a value of "zero" represents the evaluation criteria not being satisfied for the period and depth represented by the intersection, and where a value of "one" represents the evaluation criteria being satisfied for the period and depth represented by the intersection.

In some implementations, the evaluation engine 150 may determine a number of times that evaluation criteria is satisfied for each period of time and each depth, and store a representation of each of those numbers in the data set. The values of each of the intersections of columns and rows may be an integer value that represents a number of times that evaluation criteria was satisfied for that period for that depth. For example, the evaluation criteria may be fish observed sharply changing direction and the input data generator 160 may store in the data set a value of "two" to represent that two fish were observed sharply changing direction for a particular period and particular depth and store in the data set another value of "five" to represent that five fish were observed sharply changing direction for another particular period and another particular depth.

The machine-learning trained model 170 may receive the input data set and output an indication of an action to be performed for the aquatic livestock. For example, the machine-learning trained model 170 may receive the data structure, that represents the three by three matrix described above, and output an indication of "decrease feeding rate." The machine-learning trained model 170 may be a deep learning neural network that was previously trained based on a training data set that included pairs of input data sets labeled with corresponding actions to output.

Figure 2:
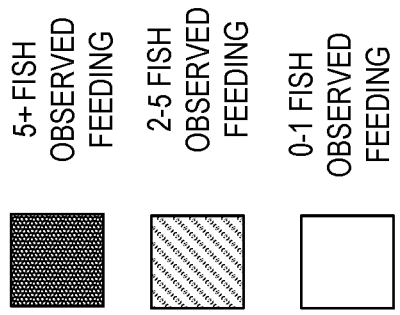
FIG. 2 is an example visualization of an input data set generated from processing collected sensor data.
Figure 2:
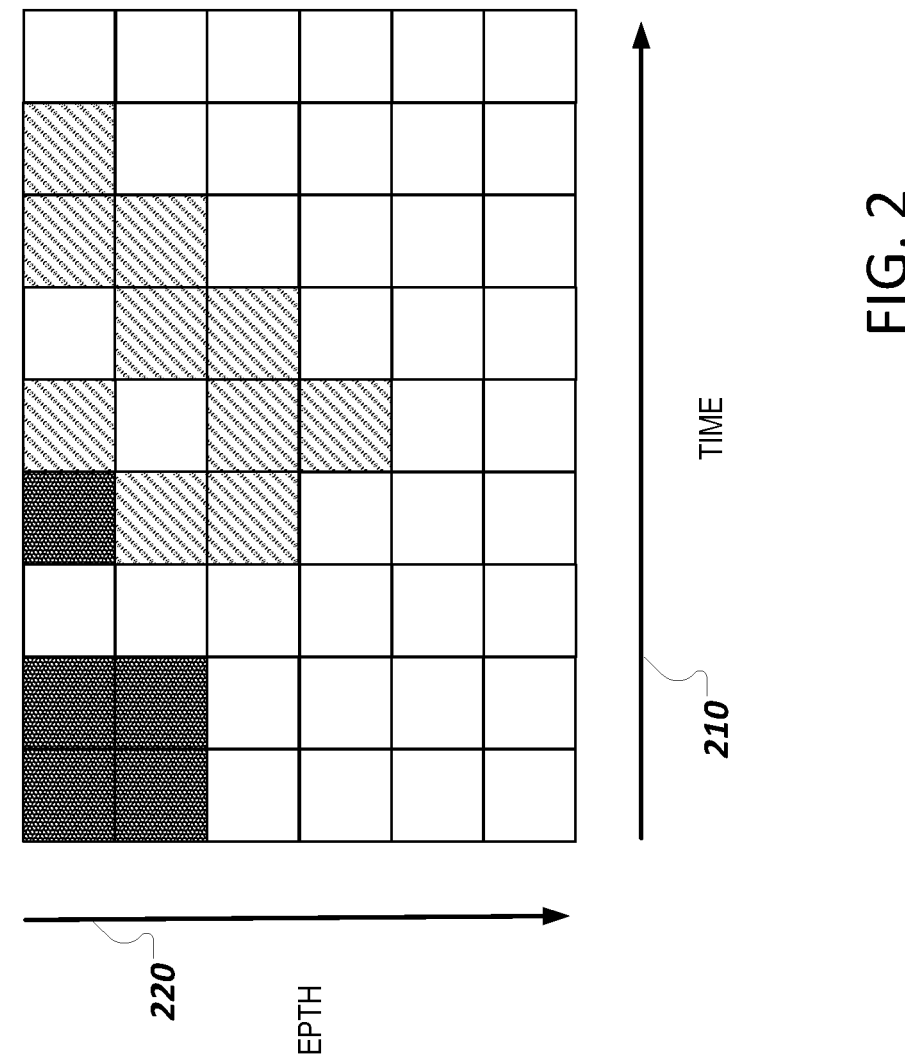

The control subsystem 140 may then initiate performance of the action that was indicated by the machine-learning trained model 170. For example, the control subsystem 140 may receive the indication of "decrease feeding rate" and, in response, transmit an instruction to a feeding subsystem that causes the feeding subsystem to reduce a rate that feed is provided to the fish. The feeding subsystem may include a blower or auger that physically dispenses feed in the form of pellets into the enclosure 110. For example, receipt of an instruction to increase feeding rate may cause the feed subsystem to increase a speed of a fan that blows the feed into the enclosure 110. In another example, receipt of an instruction to decrease feeding rate may cause the feed subsystem to decrease a speed that an augur spins feed into the enclosure 110. FIG. 2 is an example visualization 200 of an input data set generated from processing collected sensor data. The input data set shown in visualization 200 may represent an amount of fish feeding at different depths at different periods of time. The visualization 200 may represent periods of time along a first axis and depth along a second axis. The visualization 200 shows nine periods of time in nine columns, where the left most column corresponds to the oldest period of time and the rightmost column corresponds to the most recent period of time. The visualization 200 also shows six depths in six rows, where the top most row corresponds to the shallowest depth that sensor data is captured and the bottom most row corresponds to the deepest depth that sensor data is captured.

The data structure may represent each intersection of a row and column as a cell that varies between three values, a first value corresponding to between zero to one fish observed feeding, a second value corresponding to between two to five fish observed feeding, and a third value corresponding to more than five fish observed feeding.

FIG. 3 is a flow diagram for an example process 300 for processing sensor data. The example process 300 may be performed by various systems, including, for example, the control subsystem 140 of FIG. 1.

Briefly, and as will be described in more detail below, the process 300 includes obtaining sensor data regarding aquatic livestock over periods of time, where the sensor data is captured by at least one sensor at different depths inside an aquatic livestock enclosure (310), determining, for each of the periods of time, whether the sensor data captured at different depths during the period of time satisfy one or more evaluation criteria (320), generating an input data set that concatenates representations of the periods of time, where each of the representations of the periods of time indicates whether the sensor data captured at the different depths during the period of time satisfy the evaluation criteria (330), providing the input data set to a machine-learning trained model (340), receiving, as an output from the machine-learning trained model, an indication of an action to be performed for the aquatic livestock (350), and initiating performance of the action for the aquatic livestock (360).

The process 300 includes obtaining sensor data regarding aquatic livestock over periods of time, where the sensor data is captured by at least one sensor at different depths inside an aquatic livestock enclosure (310). For example, the evaluation engine 150 may receive sensor data collected by the sensor subsystem 102 during three time periods.

In some implementations, obtaining sensor data regarding aquatic livestock over periods of time includes obtaining images of the aquatic livestock captured by a camera at the different depths inside the aquatic livestock enclosure. For example, the sensor subsystem 102 may capture a sequence of images, e.g., a video, while the sensor subsystem 102 ascents and descends in the enclosure 110.

In some implementations, obtaining sensor data regarding aquatic livestock over periods of time includes obtaining a first portion of the sensor data regarding the aquatic livestock for a first period of time and, after obtaining the first portion of the sensor data regarding the aquatic livestock for the first period of time, obtaining a second portion of the sensor data regarding the aquatic livestock for a second period of time that is after the first period of time. For example, the evaluation engine 150 may obtain images captured by the sensor subsystem 102 during a first five minute period of time while the sensor subsystem 102 descends from ten meters deep to sixty meters deep, and then obtain images captured by the sensor subsystem 102 during a second five minute period of time while the sensor subsystem 102 ascends from sixty meters deep to ten meters deep.

The process 300 includes determining, for each of the periods of time, whether the sensor data captured at different depths during the period of time satisfy one or more evaluation criteria (320). For example, the evaluation engine 150 may determine for each of the depths and each of the periods of time, whether fish were detected. In some implementations, determining, for each of the periods of time, whether the sensor data captured at different depths during the period of time satisfy one or more evaluation criteria includes determining whether the sensor data captured at a first depth during a particular period of time satisfies the evaluation criteria and determining whether the sensor data captured at a second depth, that is below the first depth, during the particular period of time satisfies the evaluation criteria. For example, the evaluation engine 150 may determine whether fish were detected at a first depth range during the first five minute period of time and also determine whether fish were detected at a second depth range during the first five minute period of time.

The process 300 includes generating an input data set that concatenates representations of the periods of time, where each of the representations of the periods of time indicates whether the sensor data captured at the different depths during the period of time satisfy the evaluation criteria (330). For example, the input data generator 160 may generate a data structure that represents whether fish were detected at each of three different depths during each of three different periods of time.

In some implementations, the input data set includes a heat map that represents time along a first dimension and depth along a second dimension, and values at positions in the heat map represent a number of times the evaluation criteria was satisfied at the different depths for each of the periods of time. For example, the input data set may be the data structure represented by the visualization 200 in FIG. 2. In another example, the values at the positions may be weighted or computed scores that represent a number of times the evaluation criteria was satisfied at the different depths for each of the periods of time. In some implementations, columns in the heat map each correspond to a period of time in the periods of time. For example, the heat map may include nine columns that represent nine respective contiguous periods of time.

The process 300 includes providing the input data set to a machine-learning trained model (340). For example, the input data generator 160 may provide the input data set to the machine-learning trained model 170.

The process 300 includes receiving, as an output from the machine-learning trained model, an indication of an action to be performed for the aquatic livestock (350). For example, the control subsystem 140 may receive an indication of "decrease feeding rate," "increase feeding rate," or some other action.

The process 300 includes initiating performance of the action for the aquatic livestock (360). For example, the output of the indication "decrease feeding rate" by the machine-learning trained model 170 may initiate decreasing of the feeding rate. In another example, the control subsystem 140 may receive the indication "decrease feeding rate" from the machine-learning trained model 170 and, in response, transmit an instruction to feeding subsystem that causes the feeding subsystem to reduce the rate that the feeding subsystem provides feed to the fish.

In some implementations, the process 300 includes obtaining training data that includes input data sets that each concatenate representations of previous periods of time and, for each of the input data sets in the training data, a respective indication of a respective action to be performed for the aquatic livestock and training the machine-learning trained model with the training data. For example, the machine-learning trained model may be a deep learning neural network that is trained with fifty data sets that are labeled with "decrease feeding rate," fifty data sets that are labeled with "increase feeding rate," and fifty data sets that are labeled with "take no action," where each of the data sets are structured similarly to the input data set.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A method comprising:
obtaining sensor data regarding aquatic livestock over periods of time, where the sensor data is captured by at least one sensor while the sensor is positioned at different depths inside an aquatic livestock enclosure;
determining, for each of the periods of time and each of the different depths that the sensor is positioned, whether the sensor data captured while the sensor is positioned at the different depth during the period of time satisfy one or more evaluation criteria;
concatenating matrix representations of the periods of time, each of the matrix representations of the periods of time indicating whether the sensor data captured while the sensor is positioned at the each of the different depths during the period of time satisfy the evaluation criteria;
providing the concatenated matrix representations to a machine-learning trained model;
receiving, as an output from the machine-learning trained model, an indication of an action to be performed for the aquatic livestock based at least on providing the concatenated matrix representations to the machine-learning trained model; and
adjusting an output rate of a feeder device for the aquatic livestock based at least on the indication.

2. The method of claim 1, wherein determining, for each of the periods of time, whether the sensor data captured during the period of time satisfy one or more evaluation criteria comprises:
determining whether the sensor data captured at a first depth during a particular period of time satisfies the evaluation criteria; and
determining whether the sensor data captured at a second depth, that is below the first depth, during the particular period of time satisfies the evaluation criteria.

3. The method of claim 1, wherein obtaining sensor data regarding aquatic livestock over periods of time, where the sensor data is captured by at least one sensor at different depths inside an aquatic livestock enclosure comprises:
obtaining images of the aquatic livestock captured by a camera at the different depths inside the aquatic livestock enclosure.

4. The method of claim 1, wherein obtaining sensor data regarding aquatic livestock over periods of time, where the sensor data is captured by at least one sensor at different depths inside an aquatic livestock enclosure comprises:
obtaining a first portion of the sensor data regarding the aquatic livestock for a first period of time; and
after obtaining the first portion of the sensor data regarding the aquatic livestock for the first period of time, obtaining a second portion of the sensor data regarding the aquatic livestock for a second period of time that is after the first period of time.

5. The method of claim 1, wherein the concatenated matrix representations comprises a heat map that represents time along a first dimension and depth along a second dimension, and values at positions in the heat map represent a number of times the evaluation criteria was satisfied at the different depths for each of the periods of time.

6. The method of claim 5, wherein columns in the heat map each correspond to a period of time in the periods of time.

7. The method of claim 1, wherein receiving, as an output from the machine-learning trained model, an indication of an action to be performed for the aquatic livestock comprises:

receiving an indication to reduce an amount of feed provided to the aquatic livestock.

8. The method of claim 1, wherein receiving, as an output from the machine-learning trained model, an indication of an action to be performed for the aquatic livestock comprises:

receiving an indication to increase an amount of feed provided to the aquatic livestock.

9. The method of claim 1, comprising:

obtaining training data that includes input data sets that each concatenate representations of previous periods of time and, for each of the input data sets in the training data, a respective indication of a respective action to be performed for the aquatic livestock; and training the machine-learning trained model with the training data.

10. The method of claim 1, wherein the aquatic livestock comprise one or more of fish or crustaceans.

11. A system comprising:

one or more computers and one or more storage devices storing instructions that are operable, when executed by the one or more computers, to cause the one or more computers to perform operations comprising:

obtaining sensor data regarding aquatic livestock over periods of time, where the sensor data is captured by at least one sensor while the sensor is positioned at different depths inside an aquatic livestock enclosure;

determining, for each of the periods of time and each of the different depths that the sensor is positioned, whether the sensor data captured while the sensor is positioned at the different depth during the period of time satisfy one or more evaluation criteria;

concatenating matrix representations of the periods of time, each of the matrix representations of the periods of time indicating whether the sensor data captured while the sensor is positioned at the each of the different depths during the period of time satisfy the evaluation criteria;

providing the concatenated matrix representations to a machine-learning trained model;

receiving, as an output from the machine-learning trained model, an indication of an action to be performed for the aquatic livestock based at least on providing the concatenated matrix representations to the machine-learning trained model; and adjusting an output rate of a feeder device for the aquatic livestock based at least on the indication.

12. The system of claim 11, wherein determining, for each of the periods of time, whether the sensor data captured during the period of time satisfy one or more evaluation criteria comprises:

determining whether the sensor data captured at a first depth during a particular period of time satisfies the evaluation criteria; and determining whether the sensor data captured at a second depth, that is below the first depth, during the particular period of time satisfies the evaluation criteria.

13. The system of claim 11, wherein obtaining sensor data regarding aquatic livestock over periods of time, where the sensor data is captured by at least one sensor at different depths inside an aquatic livestock enclosure comprises:

obtaining images of the aquatic livestock captured by a camera at the different depths inside the aquatic livestock enclosure.

14. The system of claim 11, wherein obtaining sensor data regarding aquatic livestock over periods of time, where the sensor data is captured by at least one sensor at different depths inside an aquatic livestock enclosure comprises:

obtaining a first portion of the sensor data regarding the aquatic livestock for a first period of time; and after obtaining the first portion of the sensor data regarding the aquatic livestock for the first period of time, obtaining a second portion of the sensor data regarding the aquatic livestock for a second period of time that is after the first period of time.

15. The system of claim 11, wherein the matrix representation comprises a heat map that represents time along a first dimension and depth along a second dimension, and values at positions in the heat map represent a number of times the evaluation criteria was satisfied at the different depths for each of the periods of time.

16. The system of claim 15, wherein columns in the heat map each correspond to a period of time in the periods of time.

17. The system of claim 11, wherein receiving, as an output from the machine-learning trained model, an indication of an action to be performed for the aquatic livestock comprises:

receiving an indication to reduce an amount of feed provided to the aquatic livestock.

18. The system of claim 11, wherein receiving, as an output from the machine-learning trained model, an indication of an action to be performed for the aquatic livestock comprises:

receiving an indication to increase an amount of feed provided to the aquatic livestock.

19. The system of claim 11, the operations comprising:

obtaining training data that includes input data sets that each concatenate representations of previous periods of time and, for each of the input data sets in the training data, a respective indication of a respective action to be performed for the aquatic livestock; and training the machine-learning trained model with the training data.

20. A computer-readable storage device encoded with a computer program, the program comprising instructions that when executed by one or more computers cause the one or more computers to perform operations comprising:

obtaining sensor data regarding aquatic livestock over periods of time, where the sensor data is captured by at least one sensor while the sensor is positioned at different depths inside an aquatic livestock enclosure;

determining, for each of the periods of time and each of the different depths that the sensor is positioned, whether the sensor data captured while the sensor is positioned at the different depth during the period of time satisfy one or more evaluation criteria;

concatenating matrix representations of the periods of time, each of the matrix representations of the periods of time indicating whether the sensor data captured while the sensor is positioned at the each of the different depths during the period of time satisfy the evaluation criteria;

providing the concatenated matrix representations to a machine-learning trained model;

receiving, as an output from the machine-learning trained model, an indication of an action to be performed for the aquatic livestock based at least on providing the concatenated matrix representations to the machine-learning trained model; and adjusting an output rate of a feeder device for the aquatic livestock based at least on the indication.

* * * * *